W. N. FORT.
Animal-Trap.
No. 217,602. Patented July 15, 1879.
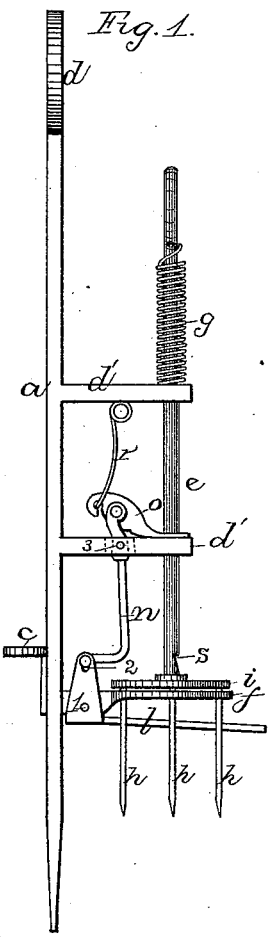
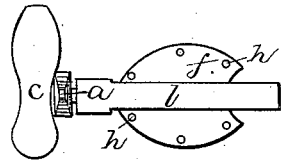
Witnesses:
J. W. Garner
W. S. D. Haines
Inventor:
W. N. Fort,
per
F. A. Lehmann,
Atty

UNITED STATES PATENT OFFICE.

WILSON N. FORT, OF LEWISVILLE, ARKANSAS.

IMPROVEMENT IN ANIMAL-TRAPS.

Specification forming part of Letters Patent No. 217,602, dated July 15, 1879; application filed May 16, 1879.

*To all whom it may concern:*

Be it known that I, WILSON N. FORT, of Lewisville, in the county of La Fayette and State of Arkansas, have invented certain new and useful Improvements in Mole-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in traps; and it consists in the combination of a standard that has its lower end stuck into the ground, a vertically-moving notched rod that has its lower end armed with prongs, and which rod is propelled by a coiled spring, a pivoted tripping-plate, connecting-rod, sliding trigger, and spring for drawing the trigger into the notch in the rod, all of which will be more fully described hereinafter.

Figure 1 is a side elevation of my invention. Fig. 2 is a bottom view of the same.

$a$ represents a suitable metallic stake or standard, which is sharpened at its lower end, so as to be forced into the ground by the pressure of the foot upon the plate $c$, and which has a ring, $d$, on its upper end, so that the trap can be conveniently carried around. Projecting outward from the side of this standard are the two guides $d'$, through which the rod $e$ plays up and down. Around the upper end of this rod is placed the coiled spring $g$, which forces the rod downward with considerable force when the trigger is tripped, and to the lower end of the rod is secured a plate, $i$, which has a number of sharp prongs, $h$, secured to its under side, and which prongs run into the mole or other animal and kill it. In order to keep these prongs always in line with the rod $e$ they are passed through a rigid guide-plate, $f$, which is secured to the same side of the standard as the two guides $d'$. Pivoted at 1 on the shank of this plate $f$ is a plate or rod, $l$, which projects outward from the standard, in between the prongs $h$, as shown, and which serves to operate the trigger when the mole or other animal happens to push up against it, and thus causes the rod $e$, with its sharp prongs $i$, to descend upon it. The upper ends of this plate or rod $l$ have the slots 2 made in them, and in these slots is fastened the lower end of the rod $n$, which connects the plate $l$ with the trigger $o$. This rod $n$ is pivoted in the lower guide, $d$, at 3, and has the trigger $o$ pivoted to its upper end. As this connecting-rod rocks on its pivot 3 it moves the trigger outward from the standard, so as to move it out of the notch in the rod $e$, when the plate $l$ is pushed upward at its outer end, and the rod, no longer being supported in an elevated position, is driven downward by the coiled spring.

To the upper end of the trigger is secured the spring $r$, which keeps the spring constantly forced inward against the side of the rod $e$, so that when the rod is raised upward until the notch $s$ comes opposite the trigger the trigger snaps into it and holds the trap set.

This trap may be used for killing moles, muskrats, rabbits, and other such small animals.

I am aware that a standard to stick in the ground, a spring-rod armed at its lower end with sharp points, a tripping-lever that is to be operated by the animal, and a trigger that catches in a notch in the side of the spring-rod are not new, and these I disclaim.

Having thus described my invention, I claim—

The combination of the standard $a$, guides $d'$, notched rod $e$, provided with the prongs $h$, plate $l$, connecting-rod $n$, trigger $o$, and spring $r$, substantially as shown and described.

In testimony that I claim the foregoing I have hereunto set my hand and seal this 6th day of May, 1879.

WILSON N. FORT. [L. S.]

Witnesses:
THOS. N. NIX,
LARKIN NIX.